United States Patent
Kobayashi

(10) Patent No.: US 10,931,049 B2
(45) Date of Patent: Feb. 23, 2021

(54) TERMINAL, CONNECTOR, AND CONNECTOR MANUFACTURING METHOD

(71) Applicant: HIROSE ELECTRIC CO., LTD., Tokyo (JP)

(72) Inventor: Yuki Kobayashi, Tokyo (JP)

(73) Assignee: HIROSE ELECTRIC CO., LTD., Tokyo (JP)

(*) Notice: Subject to any disclaimer, the term of this patent is extended or adjusted under 35 U.S.C. 154(b) by 0 days.

(21) Appl. No.: 16/698,152

(22) Filed: Nov. 27, 2019

(65) Prior Publication Data
US 2020/0176909 A1   Jun. 4, 2020

(30) Foreign Application Priority Data

Dec. 3, 2018  (JP) ............................. JP2018-226801

(51) Int. Cl.
| | | |
|---|---|---|
| *H01R 12/00* | (2006.01) | |
| *H01R 13/115* | (2006.01) | |
| *H01R 43/24* | (2006.01) | |
| *H01R 13/50* | (2006.01) | |
| *H01R 12/71* | (2011.01) | |

(52) U.S. Cl.
CPC ......... *H01R 13/115* (2013.01); *H01R 12/716* (2013.01); *H01R 13/50* (2013.01); *H01R 43/24* (2013.01)

(58) Field of Classification Search
CPC ...... H01R 13/115; H01R 43/24; H01R 13/50; H01R 12/716; H01R 12/57; H01R 13/405; H01R 12/73; H01R 13/502; H01R 12/712; H01R 43/18; B29C 45/00
USPC .............................. 439/676, 607.36, 74, 660
See application file for complete search history.

(56) References Cited

U.S. PATENT DOCUMENTS

| | | | | |
|---|---|---|---|---|
| 6,503,101 B1* | 1/2003 | Yu | ....................... | H01R 13/6597 439/607.36 |
| 8,888,506 B2* | 11/2014 | Nishimura | ......... | H01R 12/7082 439/74 |
| 8,986,027 B2* | 3/2015 | Nishimura | ........... | H01R 12/707 439/181 |
| 2005/0032400 A1* | 2/2005 | Zhang | ................... | H01R 12/716 439/74 |
| 2005/0042924 A1* | 2/2005 | Zhang | ................ | H01R 13/6582 438/607.36 |
| 2006/0063432 A1* | 3/2006 | Chen | .................... | H01R 13/658 439/607.36 |

(Continued)

FOREIGN PATENT DOCUMENTS

JP  2017-069133  4/2017

*Primary Examiner* — Abdullah A Riyami
*Assistant Examiner* — Nelson R. Burgos-Guntin
(74) *Attorney, Agent, or Firm* — Rankin, Hill & Clark LLP

(57) ABSTRACT

Provided is a terminal used for a connector including a movable portion including a movable contact as a contact with a counterpart terminal of a counterpart connector, a fixed portion including a fixed contact as a contact with the counterpart terminal, the fixed portion facing the movable portion, and a bottom portion connecting the movable portion and the fixed portion, wherein the fixed portion includes a pair of inclined portions, the inclined portions are provided on fixed portion side surfaces on both sides of the fixed portion, respectively, and the inclined portion is formed in such a manner as to spread the width of the fixed portion.

18 Claims, 9 Drawing Sheets

(56) References Cited

U.S. PATENT DOCUMENTS

| | | | | |
|---|---|---|---|---|
| 2006/0276061 | A1* | 12/2006 | Koguchi | H01R 12/725 439/74 |
| 2008/0207014 | A1* | 8/2008 | Takeuchi | H01R 12/716 439/74 |
| 2008/0305657 | A1* | 12/2008 | Midorikawa | H01R 43/0235 439/74 |
| 2009/0061655 | A1* | 3/2009 | Miyazaki | H01R 12/57 439/74 |
| 2010/0068900 | A1* | 3/2010 | Wu | H01R 12/716 439/74 |
| 2011/0263140 | A1* | 10/2011 | Sato | H01R 12/7052 439/74 |
| 2013/0012039 | A1* | 1/2013 | Nose | H01R 12/716 439/74 |
| 2015/0079816 | A1* | 3/2015 | Suzuki | H01R 12/7082 439/74 |
| 2015/0140840 | A1* | 5/2015 | Nishimura | H01R 13/6594 439/74 |
| 2015/0140841 | A1* | 5/2015 | Watanabe | H01R 43/18 439/74 |
| 2015/0207248 | A1* | 7/2015 | Takenaga | H01R 13/6582 439/74 |
| 2016/0190719 | A1* | 6/2016 | Brzezinski | H01R 12/73 439/74 |
| 2017/0098900 | A1* | 4/2017 | Kobuchi | H01R 13/405 |
| 2020/0044374 | A1* | 2/2020 | Ishida | H01R 12/721 |

* cited by examiner

TERMINAL, CONNECTOR, AND CONNECTOR MANUFACTURING METHOD

CROSS-REFERENCE TO RELATED APPLICATION

This application claims priority from Japanese Patent Application No. 2018-226801 filed with the Japan Patent Office on Dec. 3, 2018, the entire content of which is hereby incorporated by reference.

BACKGROUND

1. Technical Field

The present disclosure relates to a terminal, a connector, and a connector manufacturing method.

2. Related Art

The structure of a terminal is required which is suitable for insert molding (integral molding) of a plurality of terminals and a housing when a connector including the housing that holds the plurality of terminals is manufactured. Specifically, a terminal is required which is suitable to prevent resin from flowing to an unintended location and allow the resin to cover a part of the terminal as designed when the resin as an insulator that fixes each of the plurality of terminals and forms the housing is poured into a mold upon manufacture of a connector.

A connector is known which includes a board connected by a plurality of terminals arranged and held by, for example, insert molding (integral molding) in a housing. For example, a connector is disclosed in JP-A-2017-069133. The connector is a connector on a receptacle side (receptacle connector) that is connected to a connector on a plug side (plug connector). The connector includes a rectangular housing having a plurality of terminals arranged and held in a longitudinal direction. Both of the receptacle connector and the plug connector can be provided to a printed wiring board, a flexible flat cable, or the like. For example, a receptacle connector provided on a printed wiring board by, for example, surface mounting, and a plug connector provided at an end portion of a flexible flat cable mate with each other; accordingly, a connection can be established between boards.

A housing of the receptacle connector (or plug connector) is conventionally formed by embedding a plurality of terminals in insert molding. In insert molding, the terminals are generally arranged by a mold, a fixing jig, or the like in a possible direction of a longitudinal direction of the housing. Next, resin as an insulator is poured into a space determined by the mold to cover a part of the terminal with the resin. Lastly, the resin is cured to form the housing holding the plurality of embedded terminals. At this point in time, the mold, the fixing jig, or the like prevents the resin from flowing in such that a part which is exposed from the resin of the housing of the terminal can avoid being covered with the resin. In this manner, the flow of the resin on a front surface of the terminal is controlled by the mold, the fixing jig, or the like produced on the basis of the design of the housing. Consequently, in the housing, the front surface of the terminal can be divided into the part covered with the resin and the part exposed from the resin.

SUMMARY

A terminal used for a connector according an embodiment of the present disclosure includes a movable portion including a movable contact as a contact with a counterpart terminal of a counterpart connector, a fixed portion including a fixed contact as a contact with the counterpart terminal, the fixed portion facing the movable portion, and a bottom portion connecting the movable portion and the fixed portion, wherein the fixed portion includes a pair of inclined portions, the inclined portions are provided on fixed portion side surfaces on both sides of the fixed portion, respectively, and the inclined portion is formed in such a manner as to spread the width of the fixed portion.

DETAILED DESCRIPTION

Figure 1:
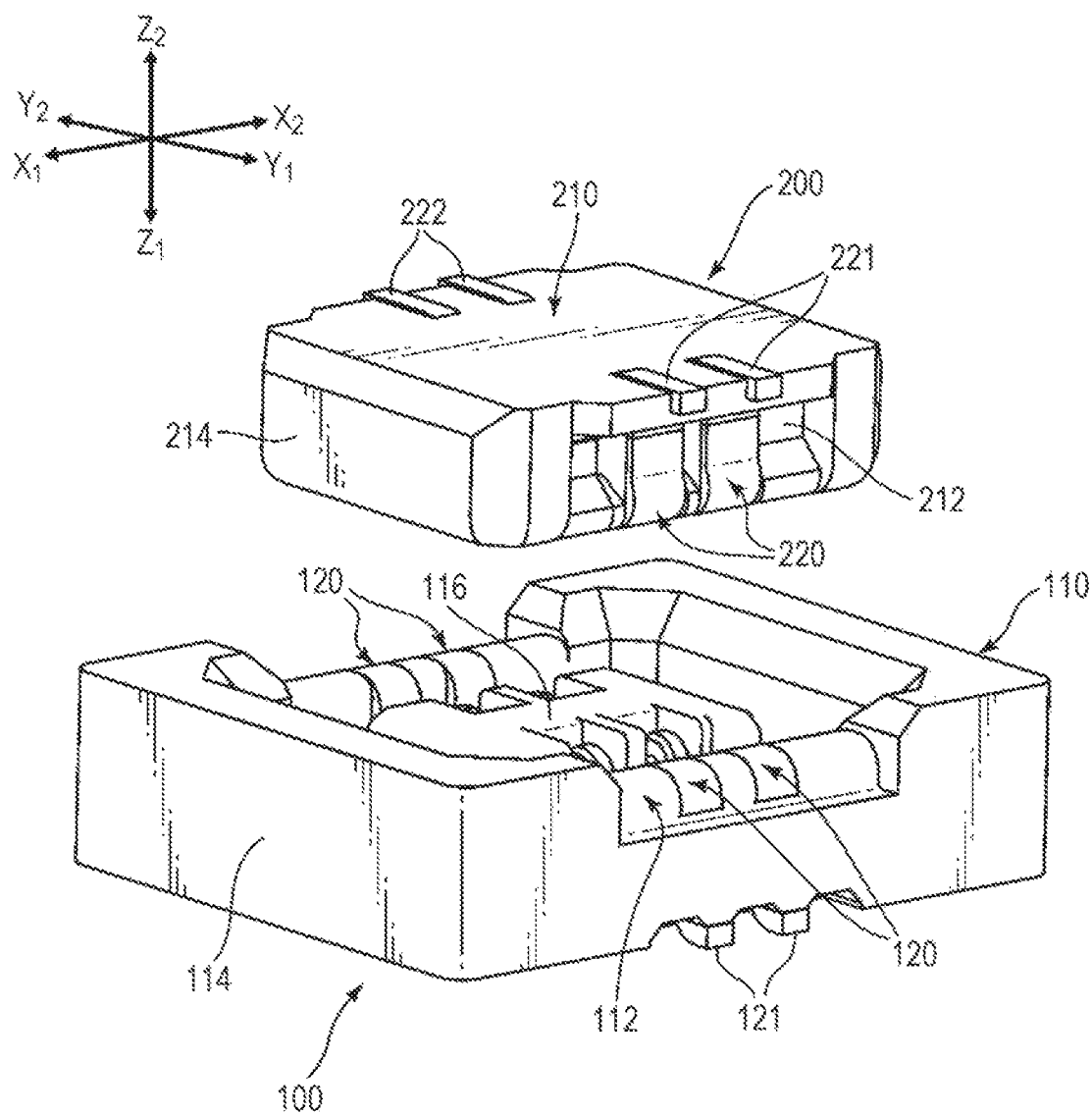
FIG. 1 is a diagram illustrating a receptacle connector including a terminal according to one embodiment of the present disclosure, and a counterpart plug connector.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A known receptacle connector and a known plug connector, which establish a connection between boards, are mounted on a board in a small electronic device such as a smartphone or a mobile terminal. Hence, these connectors are very small. A plurality of terminals being their components is also very small. Hence, it is difficult to hold and fix the terminals with a mold, a fixing jig, or the like and form a housing as designed in insert molding. The degree of difficulty generally increases with decreasing size of the connector. For example, if the plurality of terminals themselves embedded in the housing is small, a part of each of the terminals exposed from the housing may not be able to be fully covered by a mold, a fixing jig, or the like without gaps when the terminals and the housing are insert molded. Hence, it is not possible to prevent resin from flowing to the parts.

In each of the plurality of terminals embedded in the housing of the known receptacle connector described in JP-A-2017-069133, both side surfaces of a part (an opposing portion including a contact portion with a counterpart terminal and facing a spring portion) of the terminal exposed to the inside from the resin of the housing are flat. Hence, when the terminal is supported by the mold, the fixing jig, or the like, the flat side surface of the terminal does not include a protuberance such as a projection suitable for support. Hence, there is no gap in between with the mold, the fixing jig, or the like. Hence, the terminal cannot be fully supported. Moreover, for example, a distortion may occur on the flat side surface of the terminal due to various factors such as an error in terms of manufacture of the terminal. In this case, a gap occurs between the flat side surface of the terminal and the mold, the fixing jig, or the like. As a result, upon insert molding, there arises a problem that resin flown in through the gap results in covering the front surface of the terminal that should be exposed from the housing.

In order to solve the above problem, a terminal suitable to form a housing in insert molding is provided. Specifically, the terminal includes: a movable portion having a movable contact as a contact with a counterpart terminal; a fixed portion having a fixed contact serving as a contact with the counterpart terminal, the fixed portion facing the movable portion; and a bottom portion connecting the movable portion and the fixed portion. A side surface of the terminal between the fixed contact and the bottom portion is provided with an inclined portion that is configured in such a manner as to spread the width of the fixed portion. Consequently, when a mold, a fixing jig, or the like supports the side surfaces of the terminal, the inclined portions that spread the width of the fixed portion serve as projections suitable to be supported by the mold, the fixing jig, or the like. As a result, the terminal can be fully supported without gaps.

A terminal according to an embodiment of the present disclosure is a terminal used for a connector includes a movable portion including a movable contact as a contact with a counterpart terminal of a counterpart connector, a fixed portion including a fixed contact as a contact with the counterpart terminal, the fixed portion facing the movable portion, and a bottom portion connecting the movable portion and the fixed portion, wherein the fixed portion includes a pair of inclined portions, the inclined portions are provided on fixed portion side surfaces on both sides of the fixed portion, respectively, and the inclined portion is formed in such a manner as to spread the width of the fixed portion.

As a preferable terminal according to an embodiment of the present disclosure, the terminal is formed into a U-shape in such a manner that the fixed portion faces the movable portion across the bottom portion, and a part between the bottom portion and the fixed portion and a part between the bottom portion and the movable portion are bent, and a terminal side surface between the inclined portion and the middle of the bottom portion further includes a wide portion.

As a preferable terminal according to an embodiment of the present disclosure, the terminal further includes a leg portion including, at an end portion, a mounting portion for mounting on a board, a top portion connecting the fixed contact and the fixed portion, to the leg portion, wherein the leg portion faces the fixed portion.

A connector according to an embodiment of the present disclosure includes the terminal and a housing holding the terminal, wherein the housing includes a mating protrusion on the movable portion side of the terminal, and a side wall portion on the fixed portion side of the terminal, and wherein at least a bottom portion back surface of the bottom portion is exposed from an opening portion provided on a housing back surface.

In a preferable connector according to an embodiment of the present disclosure, the fixed portion is embedded in the side wall portion, and is supported by the housing, and a surface facing the movable portion and a part of the side surface of the fixed portion are exposed from the side wall portion.

In a preferable connector according to an embodiment of the present disclosure, the part of the fixed portion side surface exposed from the side wall portion includes part of a contact side portion as a side portion of the fixed contact, part of the inclined portion, and part of the wide portion.

In a preferable connector according to an embodiment of the present disclosure, a bottom portion front surface of a flat portion of the bottom portion is flush with a front surface of resin of the housing around the bottom portion front surface.

In a preferable connector according to an embodiment of the present disclosure, the fixed contact protrudes toward the movable contact side with respect to an inner wall surface of the side wall portion, and the top portion is flush with a top portion wall surface of the side wall portion.

In a preferable connector according to an embodiment of the present disclosure, the housing includes a plurality of the terminals, the plurality of the terminals is arranged at regular intervals along a longitudinal direction of the housing, and opposing surfaces of the leg portions and the fixed portions of the plurality of the terminals are supported by the side wall portion.

A connector manufacturing method for manufacturing the connector, includes (A) fixing the terminal to a fixed mold half with a fixing jig, (B) having a movable mold half configured to be capable of housing the terminal inside overlap the fixed mold half to which the terminal is fixed to place the terminal inside the movable mold half and press each of the inclined portions of the terminal with the movable mold half. (C) injecting insulating resin for forming the housing into a space between the fixed mold half and the movable mold half, (D) a step of curing the resin, and (E) removing the movable mold half and the fixed mold half to remove the housing molded with the cured resin, the housing holding the terminal.

As a preferable connector manufacturing method for manufacturing the connector, the manufacturing method further includes removing the fixing jig from the terminal to form the opening portion on the housing back surface of the housing.

In a preferable connector manufacturing method for manufacturing the connector, step (B) includes positioning the movable mold half in place with reference to a position of each of the inclined portions.

In a preferable connector manufacturing method for manufacturing the connector, step (B) includes the step of pressing a bottom portion front surface of the bottom portion of the terminal with a bottom portion fixed wall provided to a center portion of the movable mold half, and supporting the movable portion of the terminal with a movable portion support wall provided to an end portion of the movable mold half, wherein the movable mold half determines a first space between a fixed portion front surface of the fixed portion of the terminal and the bottom portion fixed wall, and a second space around the movable portion of the terminal between the bottom portion fixed wall and the movable portion support wall.

As described above, the terminal according to the embodiments of the present disclosure includes: the movable portion having the movable contact as a contact with a counterpart terminal; the fixed portion having the fixed contact as a contact with the counterpart terminal, the fixed portion facing the movable portion; and the bottom portion connecting the movable portion and the fixed portion. Furthermore, the terminal is provided with the inclined portion on the side surface between the fixed contact and the bottom portion. Such a configuration allows the inclined portions to serve as the projections suitable to be supported by the mold, the fixing jig, or the like upon supporting the side surfaces of the terminal with the mold, the fixing jig, or the like. Hence, the terminal can be fully supported without gaps. As a result, the resin being an insulator can be prevented from flowing to an unintended portion upon insert molding.

Embodiments of the present disclosure are described hereinafter with reference to the drawings. In all the drawings for explaining the embodiments, the same reference numerals are assigned in principle to the same members. Their repeated descriptions are omitted. Moreover, each embodiment is described independently. However, this does not exclude that the connector and the terminal are configured, combining constituent elements of the embodiments.

FIG. 1 illustrates a connector (receptacle connector) including a terminal according to one embodiment of the present disclosure, and a counterpart connector (plug connector). The connector of the present disclosure can be used as, for example, an internal component in a small electronic device such as a mobile phone, a smartphone, a digital camera, or a notebook personal computer. In the present disclosure, as illustrated in FIG. 1, a direction in which a plurality of terminals included in the connector is arranged is referred to here as the longitudinal direction. The longitudinal direction is an X1-X2 direction (X-axis direction). A direction orthogonal to the longitudinal direction (X-axis direction) is referred to as the lateral direction. The lateral direction is a Y1-Y2 direction (Y-axis direction).

The connector's mating direction is a Z1-Z2 direction (Z-axis direction) in FIG. 1. A receptacle connector 100 mates with a plug connector 200 being a counterpart connector on the Z2 side in the Z-axis direction. The plug connector 200 mates with the receptacle connector 100 being a counterpart connector on the Z1 side in the Z-axis direction. In this manner, the receptacle connector 100 and the plug connector 200 are electrically connected to each other.

Moreover, in terms of an upper and a lower side of the receptacle connector 100 and receptacle terminals 120, a board side (a side that is mounted on a board) is defined as "lower" or "back." Moreover, a side that receives the plug connector 200 and plug terminals 220 is defined as "upper" or "front."

The receptacle connector 100 according to one embodiment of the present disclosure includes a receptacle housing 110 and the receptacle terminals 120. The dimensions of the receptacle connector 100 are approximately 1.5 to 3.0 mm in the longitudinal direction (X-axis direction), approximately 1.5 to 2.5 mm in the lateral direction (Y-axis direction), and approximately 0.5 to 1.0 mm in the mating direction (Z-axis direction). The receptacle terminal 120 being the terminal according to one embodiment of the present disclosure is made of metal such as phosphor bronze. The receptacle terminal 120 is embedded in a first side wall portion 112 of the receptacle housing 110 in the longitudinal direction (X-axis direction). A front surface of the receptacle terminal 120 that comes into contact with the plug terminal 220 as the counterpart terminal is exposed from the first side wall portion 112, and is held by the receptacle housing 110. The receptacle terminal 120 includes, at an end portion, a mounting portion 121 for mounting on a board.

The receptacle housing 110 is made of insulating resin such as liquid crystal polymer (LCP). The receptacle housing 110 includes the first side wall portion 112 in the longitudinal direction (X-axis direction) and a second side wall portion 114 in the lateral direction (Y-axis direction). The receptacle housing 110 further includes a mating protrusion 116 extending in the longitudinal direction (X-axis direction) in a center portion surrounded by the first side wall portion 112 and the second side wall portion 114. In other words, the receptacle housing 110 includes the mating protrusion 116 on a movable portion 127 side of the receptacle terminal 120, and the first side wall portion 112 on a fixed portion 125 side of the receptacle terminal 120.

The plug connector 200 being the counterpart connector includes a plug housing 210 and the plug terminals 220. The dimensions of the plug connector 200 are approximately 1.0 to 2.5 mm in the longitudinal direction (X-axis direction), approximately 1.2 to 2.0 mm in the lateral direction (Y-axis direction), and approximately 0.4 to 0.8 mm in the mating direction (Z-axis direction). The plug terminal 220 is made of metal such as phosphor bronze. The plug connector 200 is embedded in a first side wall portion 212 of the plug housing 210 in the longitudinal direction (X-axis direction). A front surface of the plug terminal 220 that comes into contact with the receptacle terminal 120 is exposed from the first side wall portion 212, and is held by the plug housing 210. The plug terminal 220 includes, at an end portion, a mounting portion 221 for mounting on a board. The plug housing 210 is made of insulating resin such as liquid crystal polymer (LCP). The plug connector 200 includes the first side wall portion 212 in the longitudinal direction (X-axis direction), and a second side wall portion 214 in the lateral direction (Y-axis direction). The plug connector 200 further includes a mating recess 216 (refer to FIG. 2) in a center portion surrounded by the first side wall portion 212 and the second side wall portion 214.

Figure 2:
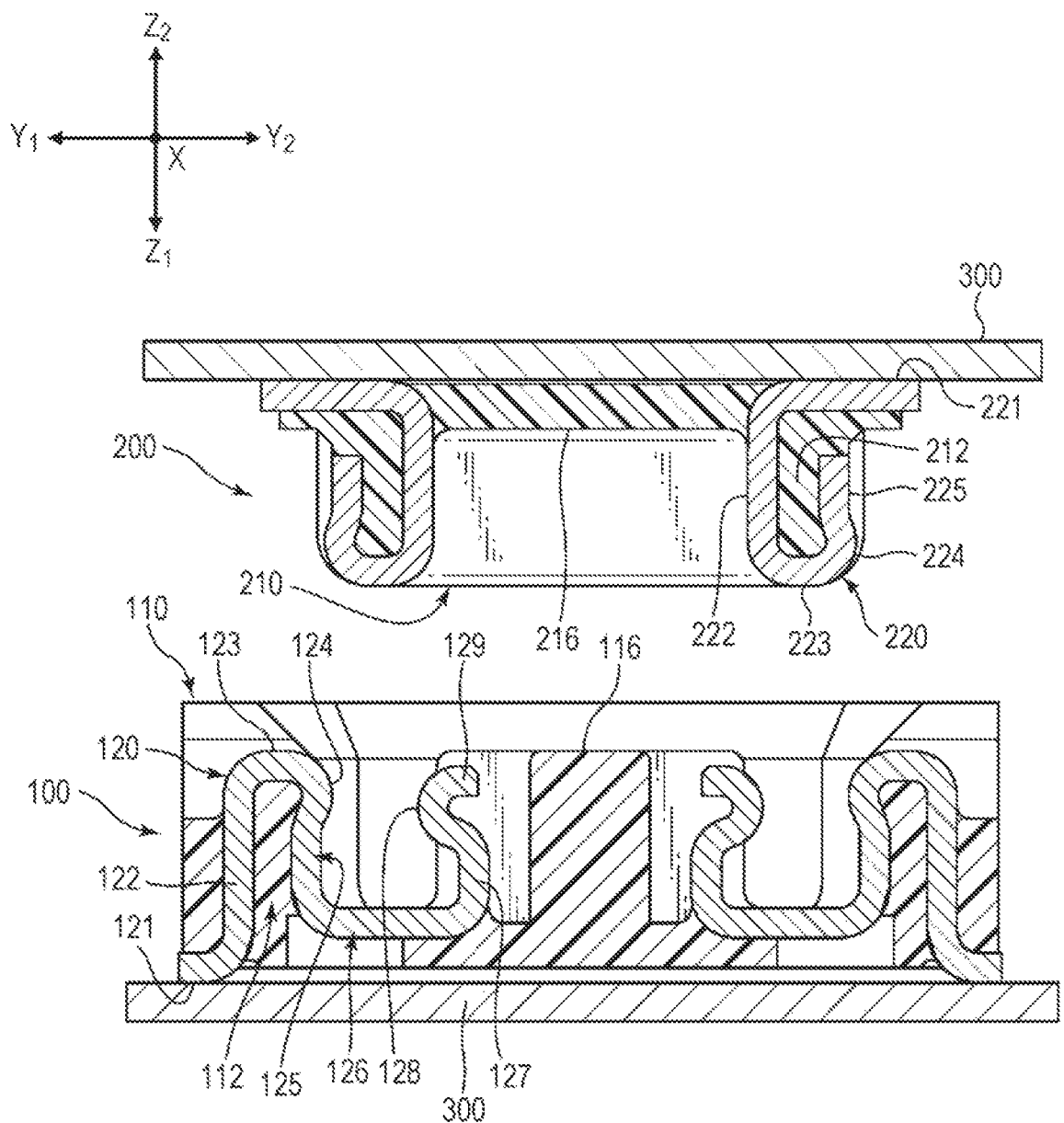
FIG. 2 is a cross-sectional view of the receptacle connector including the terminal according to one embodiment of the present disclosure, and the counterpart plug connector.

FIG. 2 is a cross-sectional view of the receptacle connector 100 and the plug connector 200 being the counterpart connector, which are illustrated in FIG. 1, taken in the lateral direction (Y-axis direction) along where the receptacle terminals 120 and the plug terminals 220 are located. FIG. 2 also illustrates the boards that are not illustrated in FIG. 1. Here, for example, a printed wiring board or a flexible flat cable where the connector is mounted is simply referred to as the "board". The mounting portion 121 of the receptacle terminal 120 is mounted on a board 300 by, for example, soldering. The mounting portion 221 of the plug terminal 220 is mounted on a board 300 by, for example, soldering. When the receptacle connector 100 and the plug connector 200 mate with each other, the mating protrusion 116 is housed in the mating recess 216.

With reference to FIG. 2, the receptacle terminal 120 includes the mounting portion 121 at the end portion on the board side, and includes a leg portion 122 via a portion bent upward (toward Z2 in the Z-axis direction) from the mounting portion 121. The leg portion 122 faces a fixed contact 124 and the fixed portion 125 across the first side wall portion 112 of the receptacle housing 110. The leg portion 122, and the fixed contact 124 and the fixed portion 125 are connected via a top portion 123 located at an end portion of the first side wall portion 112.

With reference to FIG. 1 together with FIG. 2, the leg portion 122 is completely covered with the resin of the receptacle housing 110 except for a portion adjacent to the top portion 123. In other words, the leg portion 122 is embedded in the first side wall portion 112 except the portion adjacent to the top portion 123, and is held by the receptacle housing 110. The leg portion 122, the top portion 123, the fixed contact 124, and the fixed portion 125 are supported by the first side wall portion 112 on their back surfaces (surfaces opposite to the surfaces that come into contact with the counterpart terminal). In other words, the leg portion 122 and the fixed portion 125 of the receptacle terminal 120 are supported on their opposing surfaces by the first side wall portion 112.

The fixed contact 124 is formed causing a portion of the fixed portion 125 adjacent to the top portion 123 to protrude toward a movable contact 128 (toward Y2 if the fixed portion 125 is on the Y1 side or toward Y1 if the fixed portion 125 is on the Y2 side). In a state of mating with the plug terminal 220 being the counterpart terminal, the fixed contact 124 comes into contact with, and is electrically connected to, an outer leg portion 225. The fixed contact 124 and the fixed portion 125 are supported and fixed by the first side wall portion 112 on the surfaces opposite to the surfaces that come into contact with the counterpart terminal to be made immovable upon mating with the counterpart terminal.

The receptacle terminal 120 includes a bottom portion 126 connected to the fixed portion 125 and the movable portion 127. The bottom portion 126 extends in the lateral direction (Y-axis direction) of the receptacle connector 100, and is connected to the fixed portion 125 and the movable portion 127 via portions bending at a right angle. A part of a surface on the board side (a side (Z1 side) opposite to a surface that receives the counterpart terminal (a surface on the Z2 side)) of the bottom portion 126 is supported by resin near the mating protrusion 116 of the receptacle housing 110.

The movable portion 127 is a free end that does not touch a side wall of the mating protrusion 116. The movable portion 127 includes the movable contact 128 formed in such a manner as to protrude toward the fixed contact 124 around an end portion. The movable portion 127 includes a movable end portion 129 at the farther end than the movable contact 128. The movable portion 127 receives the plug terminal 220 being the counterpart terminal, and mates with the plug terminal 220. At this point in time, the movable portion 127 is deformed, pressed by elasticity toward the mating protrusion 116. In other words, in the mating state, the movable contact 128 comes into contact with, and is electrically connected to, an inner leg portion 222 of the plug terminal 220.

The plug terminal 220 includes the mounting portion 221 at the end portion on the board side. The plug terminal 220 includes the inner leg portion 222 via a portion bending downward from the mounting portion 221. The inner leg portion 222 faces the outer leg portion 225 across the first side wall portion 212 of the plug housing 210. The inner leg portion 222 and the outer leg portion 225 are connected via a top portion 223 located at an end portion of the first side wall portion 212. The inner leg portion 222, the top portion 223, a contact 224, and the outer leg portion 225 are supported by the first side wall portion 212 on their back surfaces (surfaces opposite to the surfaces that come into contact with the counterpart terminal).

The contact 224 is formed in such a manner that a portion, which is adjacent to the top portion 223, of the outer leg portion 225 protrudes outward. Consequently, the plug terminal 220 comes into contact with, and is electrically connected to, the fixed portion 125 when mating with the receptacle terminal 120 being the counterpart terminal. The inner leg portion 222, the top portion 223, the contact 224, and the outer leg portion 225 are fixed by the first side wall portion 212 to be made immovable upon mating with the counterpart terminal.

Figure 3:
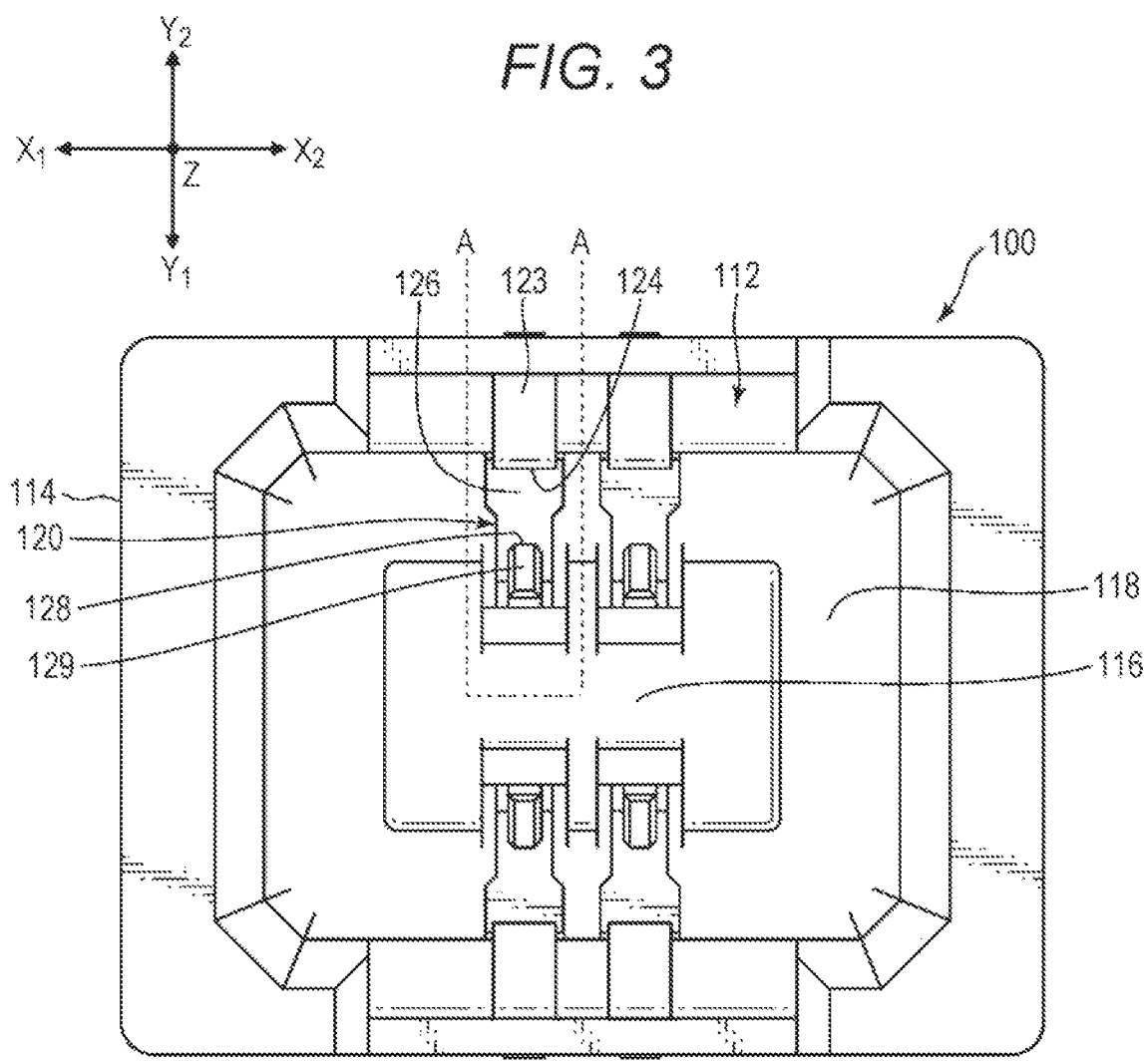
FIG. 3 is a diagram of the receptacle connector including the terminal according to one embodiment of the present disclosure as viewed from a side that mates with the plug connector.

FIG. 3 is a diagram of the receptacle connector including the terminal according to one embodiment of the present disclosure as viewed from above (the side that mates with the plug connector). In FIG. 3, the reference numeral "120" is assigned to a part of the plurality of terminals in the receptacle connector 100. The reference numerals of the other terminals of the same shape are omitted. The receptacle housing 110 includes a plurality of the receptacle terminals 120. The plurality of the receptacle terminals 120 is arranged at regular intervals along the longitudinal direction (X-axis direction) of the receptacle housing 110.

Figure 4:
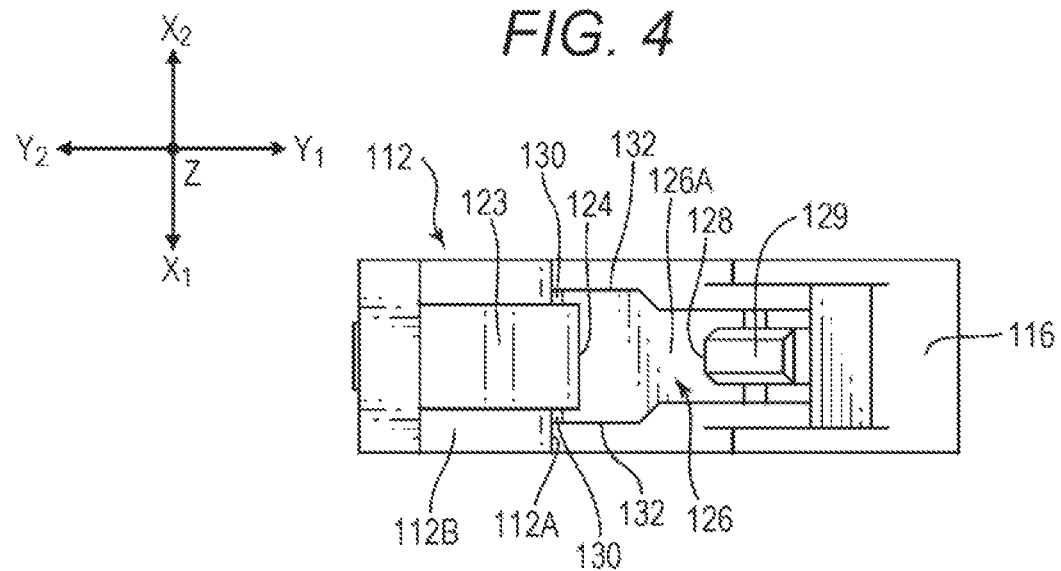
FIG. 4 is a diagram illustrating a portion around the terminal included in the receptacle connector, taken along line A-A in FIG. 3.
Figure 5:
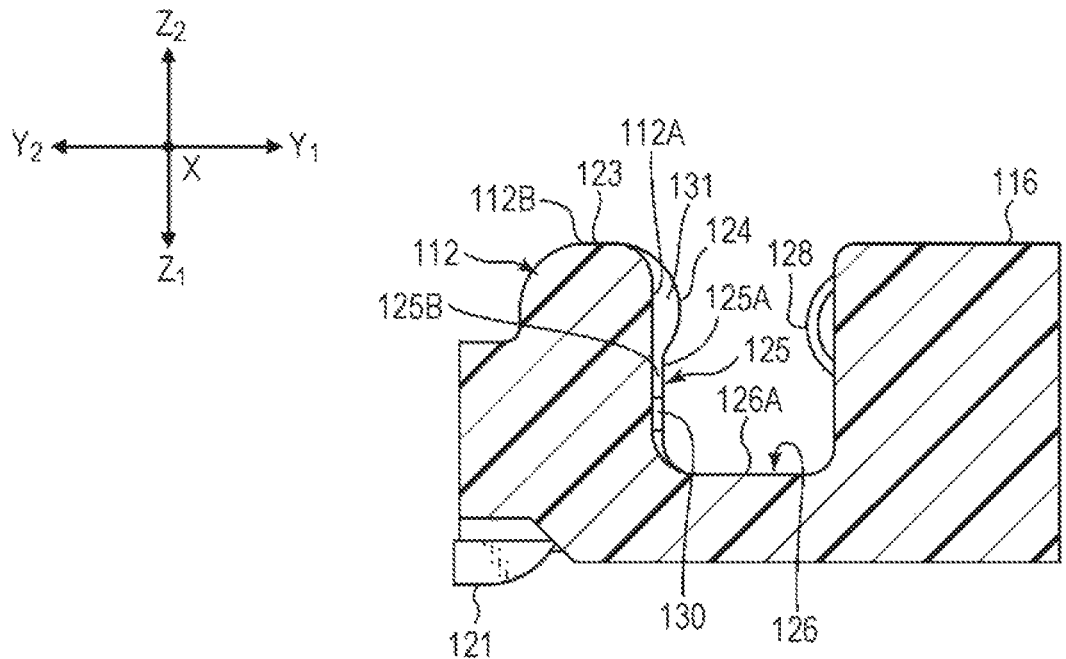
FIG. 5 is a diagram of the portion around the terminal illustrated in FIG. 4 as viewed from the side.
Figure 6:
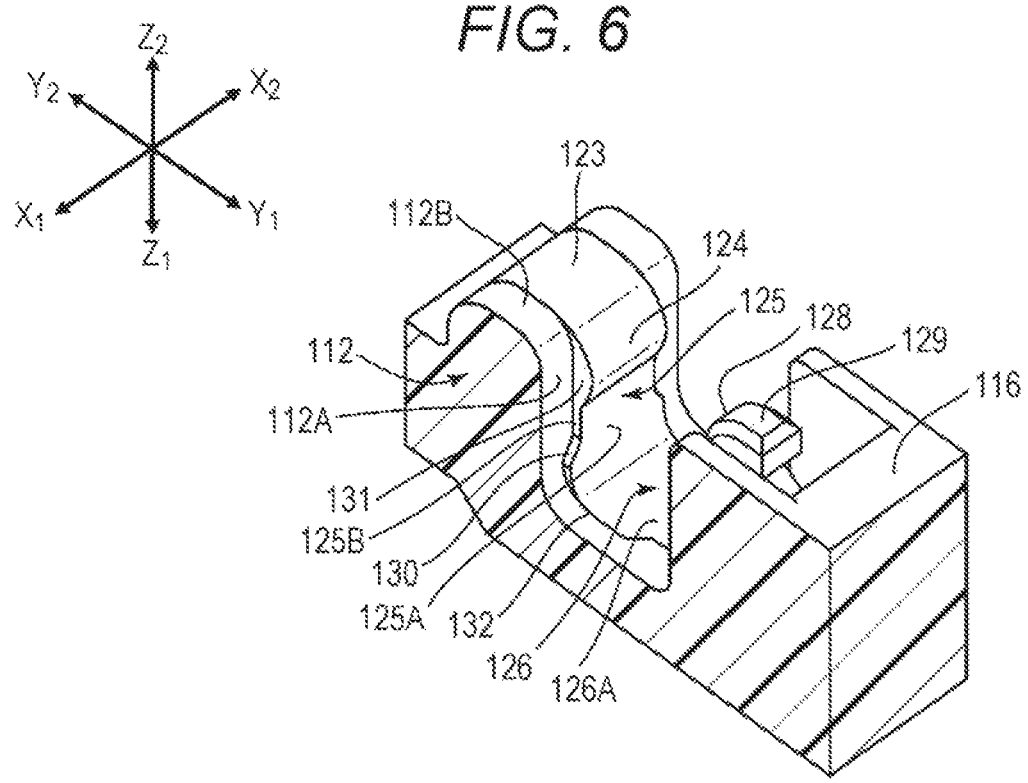
FIG. 6 is a perspective view of the portion around the terminal illustrated in FIG. 5 as viewed from the side that mates with the plug connector.
Figure 7:
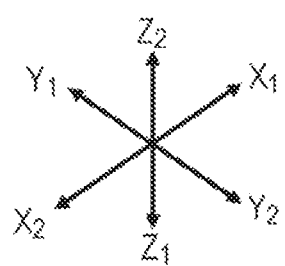
FIG. 7 is a perspective view of the portion around the terminal illustrated in FIG. 5 as viewed from a board side.
Figure 7:
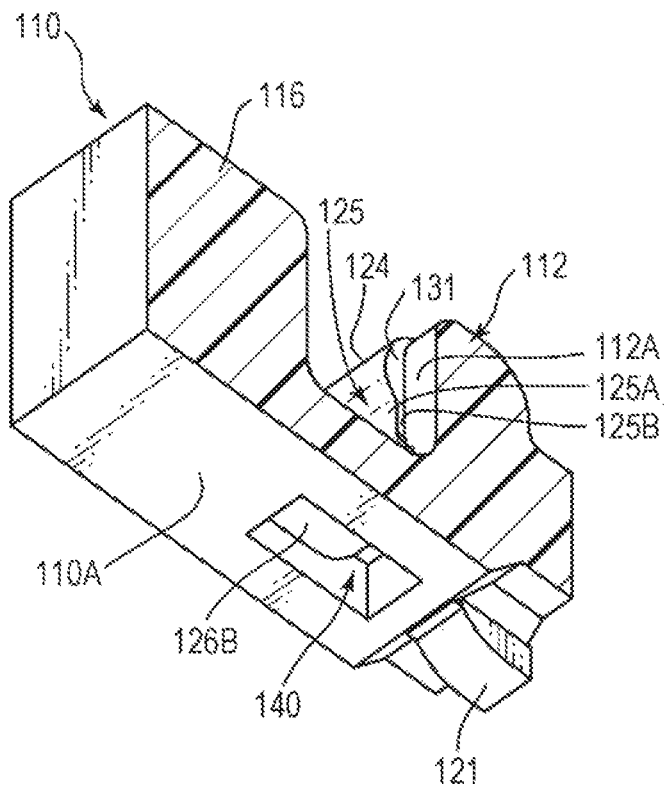

A portion around the terminal taken along line A-A in FIG. 3 is illustrated in FIGS. 4 to 7. FIG. 4 is a diagram of the portion around the terminal taken along line A-A as viewed from above. FIG. 5 is a diagram of the portion around the terminal as viewed from the side (the X-axis direction). FIG. 6 is a perspective view of the portion around the terminal taken along line A-A as viewed from above (the Z2 side in the Z-axis direction). FIG. 7 is a perspective view of the portion around the terminal as viewed from below (the Z1 side in the Z-axis direction).

As illustrated in FIGS. 3 to 6, the movable end portion 129 of the receptacle terminal 120 is housed in a space formed in the mating protrusion 116 of the receptacle connector 100. The movable portion 127 deforms when mating with the plug terminal 220 being the counterpart terminal. In this manner, the movable end portion 129 can move to the mating protrusion 116 side. As illustrated in FIG. 4, the receptacle terminal 120 is bilaterally symmetrical as viewed from the plug connector 200 side (the Z2 side) in the mating direction (Z-axis direction). Naturally, one side has the same configuration as the other side.

As illustrated in, for example, FIGS. 5 and 7, the fixed portion 125 of the receptacle terminal 120 is embedded in, and supported by, the first side wall portion 112. A fixed portion front surface 125A facing the movable portion 127, and a part of a fixed portion side surface 125B (a side surface between the fixed contact 124 and the bottom portion 126) of the fixed portion 125 are exposed from the first side wall portion 112. In other words, the fixed portion side surface 125B of the fixed portion 125 is not completely covered up to the thickness of the receptacle terminal 120 with the resin of the receptacle housing 110. The fixed portion 125 is supported and fixed by the first side wall portion 112 in a state where the fixed portion front surface 125A and a part of the fixed portion side surface 125B are exposed from an inner wall surface 112A of the first side wall portion 112.

As illustrated in for example, FIGS. 4 to 7, the fixed contact 124 of the receptacle terminal 120 protrudes toward the mating protrusion 116 with respect to the inner wall surface 112A of the first side wall portion 112. A contact side surface 131 of the fixed contact 124 is exposed from the first side wall portion 112. With reference to FIG. 7, a housing back surface 110A being a surface facing the board of the receptacle housing 110 is provided with an opening portion 140. At least, a bottom portion back surface 126B being a back surface of the bottom portion 126 of the receptacle terminal 120 and the bent portion around the bottom portion back surface 126B are exposed from the opening portion 140.

Figure 8:
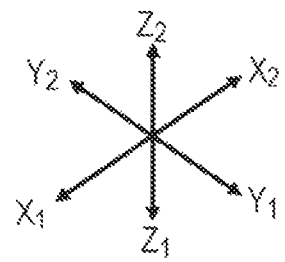
FIG. 8 is a diagram illustrating only the terminal according to one embodiment of the present disclosure, taken out from the portion around the terminal illustrated in FIG. 6.
Figure 8:
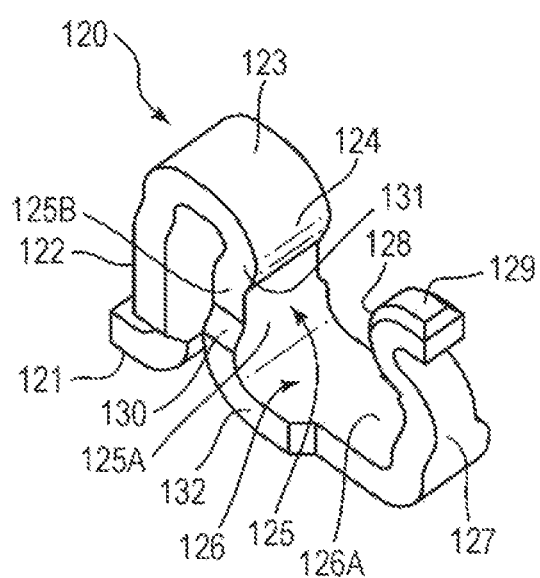

FIG. 8 is a diagram illustrating only the terminal according to one embodiment of the present disclosure taken out from the portion around the terminal illustrated in FIG. 6. As illustrated in FIGS. 4 to 6 in addition to FIG. 8, the fixed portion 125 includes an inclined portion 130 between the fixed contact 124 and the bottom portion 126 on the fixed portion side surface 125B. The inclined portion 130 is formed in such a manner as to spread the width of the fixed portion 125. The fixed portion 125 has a pair of the inclined portions 130. The inclined portion 130 is provided to the fixed portion side surface 125B on both sides of the fixed portion 125. In other words, the fixed portion 125 includes one of the inclined portions 130 on one of the fixed portion side surfaces 125B and the other inclined portion on the other fixed portion side surface 125B.

The receptacle terminal 120 bends upward (toward Z2) in the mating direction (Z-axis direction) from the bottom portion 126 between the bottom portion 126 and the fixed portion 125 in such a manner that the fixed portion 125 faces the movable portion 127 via the bottom portion 126. The receptacle terminal 120 similarly bends upward (toward Z2) in the mating direction (Z-axis direction) from the bottom portion 126 between the bottom portion 126 and the movable portion 127. Accordingly, a portion of the receptacle terminal 120 from the fixed portion 125 through the bottom portion 126 to the movable portion 127 is formed into a U-shape. The receptacle terminal 120 includes a wide portion 132 on a terminal side surface between the inclined portion 130 and the bottom portion 126 (a side surface of the bent portion between the inclined portion 130 and the bottom portion 126 and of a surrounding portion thereof). In other words, the wide portion 132 is formed from the inclined portion 130 of the fixed portion 125 through the bent portion to the middle of the side surface of the bottom portion 126.

As illustrated in FIG. 5 or 6, a part of the fixed portion side surface 125B of the fixed portion 125 is exposed from the first side wall portion 112. A part of the fixed portion side surface 125B of the fixed portion 125 includes a part of the contact side surface 131, a part of the inclined portion 130 provided on the fixed portion side surface 125B of the fixed portion 125, and a part of the wide portion 132. A bottom portion front surface 126A being a front surface of a flat portion of the bottom portion 126 is flush with a front surface of the resin of the receptacle housing 110 around the bottom portion front surface 126A. Moreover, the fixed contact 124 protrudes toward the movable contact 128 with respect to the inner wall surface of the first side wall portion 112. The top portion 123 is flush with a top portion wall surface 112B of the first side wall portion 112.

Figure 9:
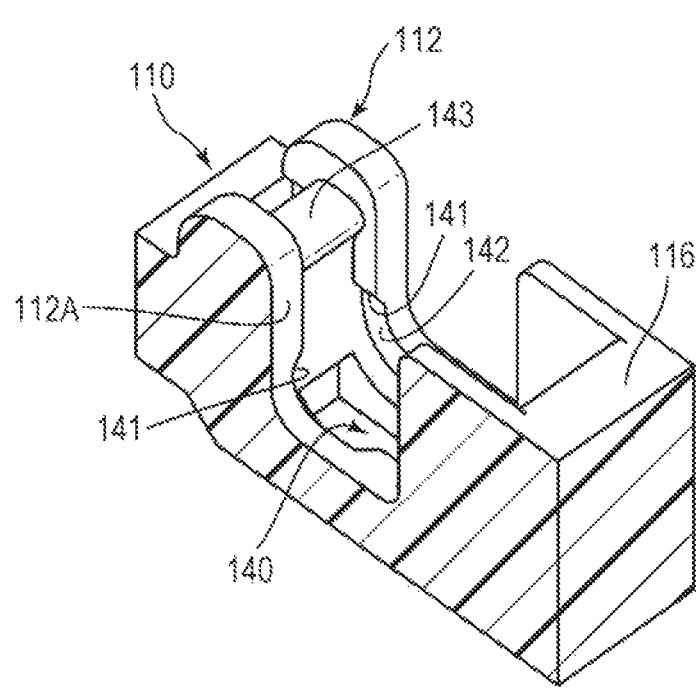
FIG. 9 is a diagram illustrating only a housing part of the portion around the terminal illustrated in FIG. 6.
Figure 10:
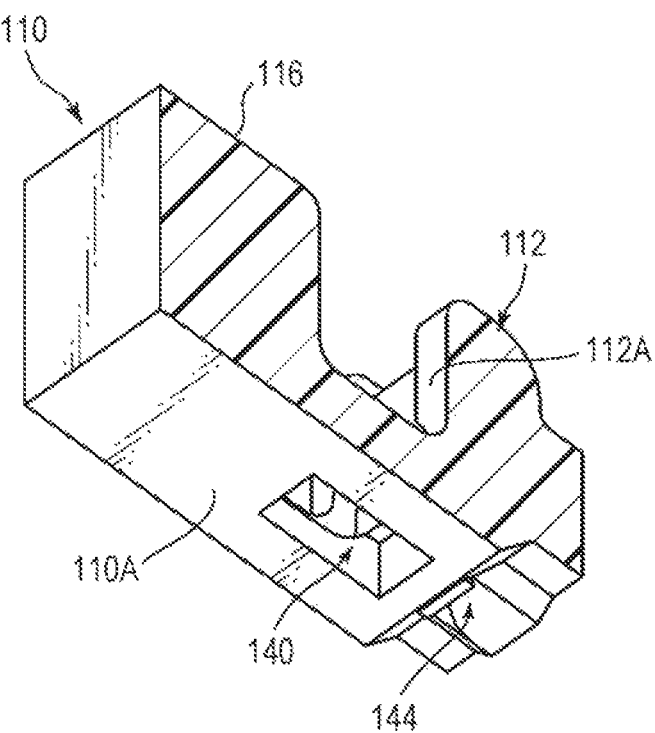
FIG. 10 is a diagram illustrating only the housing part of the portion around the terminal illustrated in FIG. 7.

FIGS. 9 and 10 are diagrams illustrating only the housing part of the portion around the terminal illustrated in FIGS. 6 and 7. The receptacle housing 110 is formed by insert molding with the receptacle terminal 120. In the receptacle housing 110, the resin being the insulator surrounds the receptacle terminal 120. The housing part that supports the receptacle terminal 120 includes an inclined inner wall portion 141 in contact with the inclined portion 130 of the receptacle terminal 120, a wide inner wall portion 142 in contact with the wide portion 132, and a support top portion 143 that supports a back surface (a surface on the board side) of the top portion 123. Moreover, the housing back surface 110A being the back surface of the receptacle housing 110 includes a support mounting portion 144 that supports the mounting portion 121 other than the bottom portion back surface 126B of the bottom portion 126 of the receptacle terminal 120, and the opening portion 140 that exposes the portion around the bottom portion back surface 126B.

Figure 11:
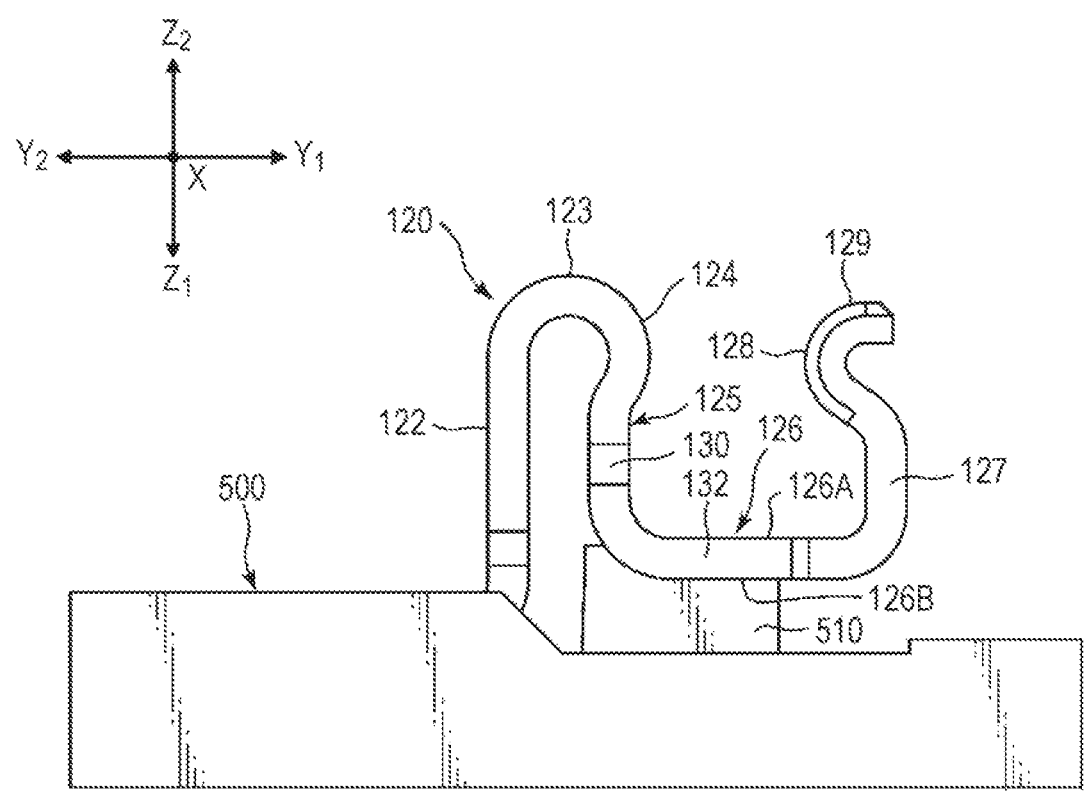
FIG. 11 is a diagram illustrating a mold half supporting a lower part of the terminal upon insert molding.

FIG. 11 is a diagram illustrating a mold half that supports a lower part of the receptacle terminal upon insert molding. The receptacle housing 110 where the plurality of the receptacle terminals 120 is arranged in two rows at regular intervals in the longitudinal direction (X-axis direction) is formed by insert molding. Hence, the receptacle terminals 120 are fixed to a fixed mold half 500 by a fixing jig 510 of the mold half. The fixing jig 510 supports and fixes the bottom portion back surface 126B of the bottom portion 126 of the receptacle terminal 120 and the bent portion around the bottom portion back surface 126B. The opening portion 140 formed in the housing back surface 110A of the receptacle housing 110, which is illustrated in FIGS. 7 and 10, is a trace of the removed fixing jig 510 after insert molding. In other words, the opening portion 140 is a hole that is formed when the mold, the fixing jig, or the like that has fixed the receptacle terminal 120 is removed from the receptacle terminal 120 after the end of insert molding.

Figure 12:
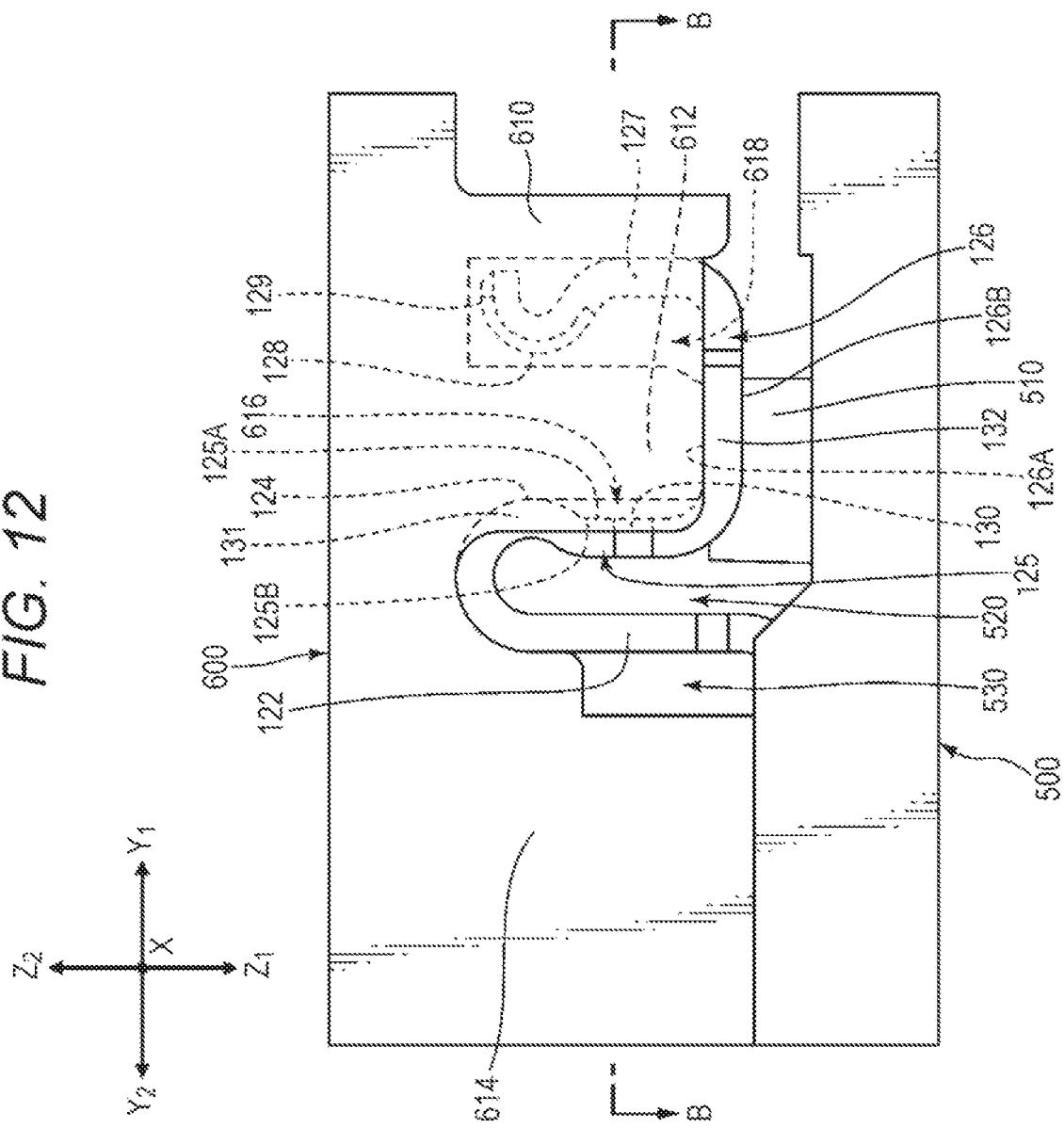
FIG. 12 is a diagram illustrating another movable mold half overlapping from above the fixed mold half supporting the lower part of the terminal upon insert molding.

FIG. 12 is a diagram illustrating another movable mold half placed from above (the Z2 side in the Z-axis direction) on the fixed mold half supporting the lower part (the Z1 side in the Z-axis direction) of the terminal upon insert molding. A movable mold half 600 is configured in such a manner as to be capable of housing inside the receptacle terminal 120 fixed by the fixing jig 510 to the fixed mold half 500. The movable mold half 600 is placed on the fixed mold half 500 fixing the receptacle terminal 120 with the fixing jig 510, which allows spaces where resin enters to be determined around the leg portion 122 of the receptacle terminal 120, between the leg portion 122 and the fixed portion 125, and between the bottom portion back surface 126B and the fixed mold half 500 when the receptacle terminal 120 is placed inside the movable mold half 600. For example, a first resin filling space 520 and a second resin filling space 530 are formed by the movable mold half 600 between the leg portion 122 and the fixed portion 125, and outside the leg portion 122 (on the Y2 side in FIG. 12), respectively. At this point in time, each of the inclined portions 130 of the receptacle terminal 120 is pressed by the movable mold half 600.

The movable mold half 600 includes a movable portion support wall 610 at an end part on the movable portion 127 side (the Y1 side in FIG. 12) of the receptacle terminal 120. The movable portion support wall 610 supports the movable portion 127 and prevents the entrance of resin upon insert molding. Moreover, the movable mold half 600 includes a bottom portion fixed wall 612 in a center portion. The bottom portion fixed wall 612 comes into contact with the bottom portion front surface 126A of the bottom portion 126 to fix the bottom portion back surface 126B. In order to achieve this, the movable mold half 600 holds the bottom portion 126 in between with the fixing jig 510. The movable mold half 600 further includes an outer wall portion 614 that determines the second resin filling space 530 of the leg portion 122 on the leg portion 122 side (the Y2 side in FIG. 12).

When the movable mold half 600 supports the side surfaces of the receptacle terminal 120, the pair of the inclined portions 130 of the receptacle terminal 120 serves as projections suitable to be supported by the movable mold half 600. Hence, the receptacle terminal 120 can be fully supported without gaps. In other words, when, upon insert molding, the movable mold half 600 is moved from up (the Z2 side) to down (the Z1 side), and is placed on the fixed mold half 500, the movable mold half 600 can firmly press the pair of the inclined portions 130 of the receptacle terminal 120 as the projections. In this manner, the receptacle terminal 120 can be reliably fixed to the fixed mold half 500. Moreover, the movable mold half 600 presses the pair of the inclined portions 130 of the receptacle terminal 120 to allow the movable mold half 600 to be positioned in place with reference to the positions of the inclined portions 130. As a result, a gap between the mold and the terminal that can be created due to the displacement of the movable mold half 600 can be prevented in advance.

When the receptacle housing 110 including one or more receptacle terminals 120 is formed in insert molding, the terminals are arranged first by the fixed mold half 500, the movable mold half 600, the fixing jig 510, and the like in a direction that can be the longitudinal direction (X-axis direction) of the receptacle housing 110. Next, insulating resin with fluidity is poured into the spaces determined by the mold (such as the first resin filling space 520 and the second resin filling space 530). Accordingly, the surrounding of the leg portion 122 except the portion around the top portion 123 of the receptacle terminal 120 can be fully covered with the resin. Moreover, the other part can be covered with the resin in such a manner that the top portion 123 of the receptacle terminal 120, the fixed portion front surface 125A of the fixed portion 125, a part of the fixed portion side surface 125B of the fixed portion 125, the bottom portion front surface 126A, and the movable portion 127 are exposed from the resin. Lastly, after the resin is cured, the housing formed by the curing of the resin can be taken out by removing the movable mold half 600 and the fixed mold half 500. In the end, the receptacle housing 110 where the plurality of the receptacle terminals 120 is embedded and held can be formed.

In the receptacle terminal 120, the movable mold half 600 presses and covers the contact side surfaces 131 of the fixed contact 124, the fixed portion side surfaces 125B of the fixed portion 125, the inclined portions 130, and the portions around the bent portions of the wide portions 132. Furthermore, the fixed mold half 500 covers the portion around the mounting portion 121. Consequently, upon insert molding, it is possible to prevent the resin from flowing to the portions exposed from the resin of the receptacle housing 110. Especially, the inclined portion 130 provided on the fixed portion side surface 125B of the fixed portion 125 of the receptacle terminal 120 functions as the projection suitable to be supported by the mold, the fixing jig, or the like. Hence, a greater force in the perpendicular direction (the Z1 side in the Z-axis direction) produced when the movable mold half 600 presses the receptacle terminal 120 against the fixing jig 510 is also transmitted to the inclined portion 130 of the receptacle terminal 120 than in a case where the side surface is not provided with the inclined portion. Hence, the side surface of the receptacle terminal 120 (especially, the fixed portion 125) can be covered without gaps.

In this manner, the receptacle terminal 120 is sandwiched between the movable mold half 600 and the fixed mold half 500, using the inclined portions 130 of the receptacle terminal 120. Accordingly, it is possible to support the fixed portion side surfaces 125B of the receptacle terminal 120 without gaps, and appropriately prevent the resin from flowing to the front surface of the receptacle terminal 120 and parts of the fixed portion side surfaces 125B of the fixed portion 125. Hence, the receptacle housing 110 such as those illustrated in FIGS. 3 to 6 can be formed through insert molding.

The gap between the flat side surface of the terminal and the mold, the fixing jig, or the like may be created, for example, when a distortion or the like occurs on the flat side surface of the terminal due to various factors such as an error in terms of manufacture of the terminal. However, the inclined portion 130 is provided on the side surface of the receptacle terminal 120 according to one embodiment of the present disclosure. Accordingly, the force of the movable mold half 600 pressing in the perpendicular direction is transmitted to the inclined portion 130. As a result, the receptacle terminal 120 can be supported more strongly than before. Hence, even if the flat side surface of the terminal is, for example, distorted, a gap between the side surface and the mold resulting from the distortion can be filled. In this manner, the resin can be appropriately prevented from flowing to the front surface of the receptacle terminal 120, and a part of the fixed portion side surface 125B of the fixed portion 125.

Figure 13:
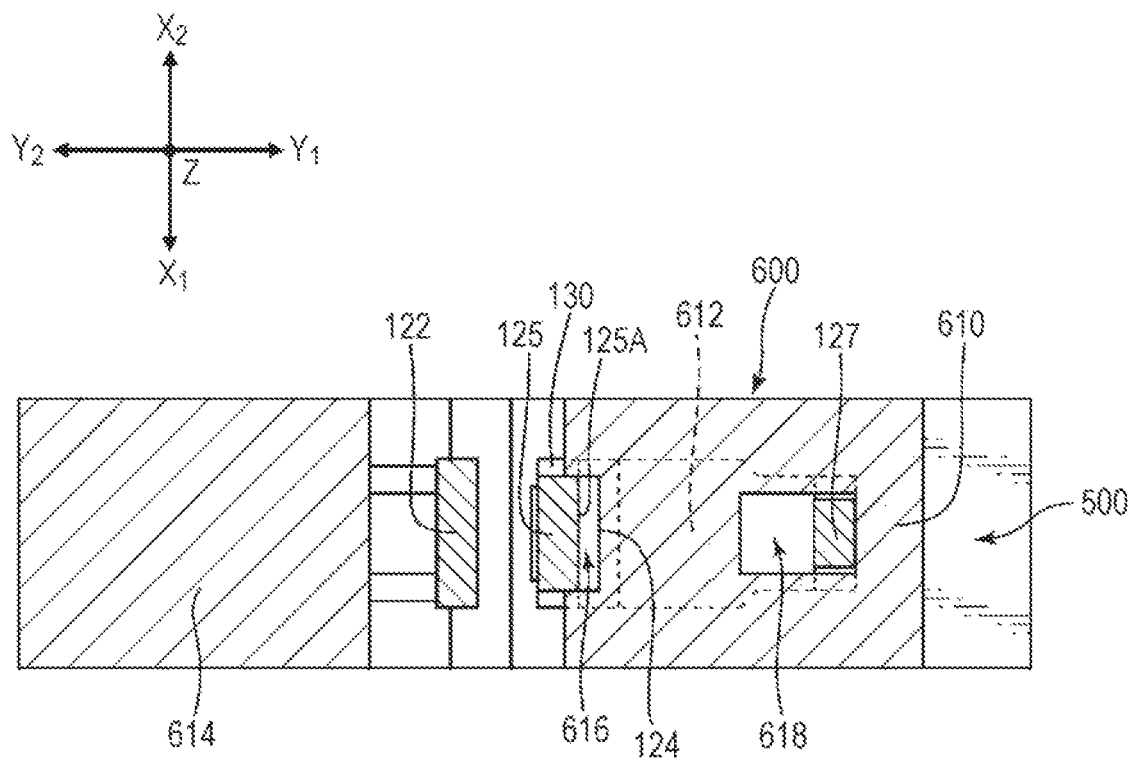
FIG. 13 is a cross-sectional view of the movable mold half and the terminal taken along line B-B in FIG. 12 as viewed from above.

FIG. 13 is a cross-sectional view of the mold and the terminal taken along line B-B in FIG. 12 as viewed from above. The fixed portion side surface 125B of the fixed portion 125 of the receptacle terminal 120 is in contact with a side surface of a groove portion formed into a recess in a front surface of the bottom portion fixed wall 612 of the movable mold half 600. The inclined portion 130 is supported without gaps by the groove portion of the bottom portion fixed wall 612 of the movable mold half 600 formed in such a manner as to fit the shape of the inclined portion 130. A first space 616 is formed between the fixed portion front surface 125A of the fixed portion 125 of the receptacle terminal 120 and the bottom portion fixed wall 612 facing the fixed contact 124 protruding more than the fixed portion 125. However, the surrounding of the first space 616 is tightly blocked by the movable mold half 600 (the bottom portion fixed wall 612) without gaps. Hence, the resin does not flow into the first space 616 upon insert molding. The gap is blocked in this manner; accordingly, the fixed portion front surface 125A and a part of the fixed portion side surface 125B of the fixed portion 125 of the receptacle terminal 120 can be exposed from the resin of the receptacle housing 110.

A second space 618 is also formed between the movable portion 127 and the bottom portion fixed wall 612. However, the surrounding of the second space 618 is tightly blocked by the movable portion support wall 610 and the bottom portion fixed wall 612 without gaps. Hence, the resin does not flow into the second space 618 upon insert molding. The gap is blocked in this manner; accordingly, the movable portion 127 can be exposed from the resin of the receptacle housing 110. The first resin filling space 520 as the space that is filled with the resin is formed between the fixed portion 125 and the leg portion 122. Similarly, the second resin filling space 530 as the space that is filled with the resin is also formed between the leg portion 122 and the outer wall portion 614.

As described above, the individual embodiments of the present disclosure are not independent embodiments. A mode carried out by combining some of the embodiments as appropriate is also included in the embodiments.

The connector according to the present disclosure can be used for a purpose such as a connection by a flat cable between boards in an electronic device such as a smartphone or mobile phone that transmits an electric signal at high speed.

What is claimed is:

1. A connector comprising:
a terminal; and
a housing holding the terminal, wherein
the terminal includes;
   a movable portion including a movable contact as a contact with a counterpart terminal of a counterpart connector;
   a fixed portion including a fixed contact as a contact with the counterpart terminal, the fixed portion facing the movable portion; and
   a bottom portion connecting the movable portion and the fixed portion, wherein
   the fixed portion includes a pair of inclined portions,
   the inclined portions are provided on fixed portion side surfaces on both sides of the fixed portion, respectively, and
   the inclined portion is formed in such a manner as to spread the width of the fixed portion,
the housing includes:
   a mating protrusion on the movable portion side of the terminal; and
   a side wall portion on the fixed portion side of the terminal, and
at least a bottom portion back surface of the bottom portion is exposed from an opening portion provided on a housing back surface.

2. The connector according to claim 1, wherein
the terminal further includes:
   a leg portion including, at an end portion, a mounting portion for mounting on a board; and
   a top portion connecting the fixed contact and the fixed portion, to the leg portion, wherein
the leg portion faces the fixed portion.

3. The connector according to claim 1, wherein
the terminal is formed into a U-shape in such a manner that the fixed portion faces the movable portion across the bottom portion, and a part between the bottom portion and the fixed portion and a part between the bottom portion and the movable portion are bent, and
a terminal side surface between the inclined portion and the middle of the bottom portion further includes a wide portion.

4. The connector according to claim 1, wherein
the fixed portion is embedded in the side wall portion, and is supported by the housing, and
a surface facing the movable portion and a part of the side surface of the fixed portion are exposed from the side wall portion.

5. The connector according to claim 4, wherein the part of the fixed portion side surface exposed from the side wall portion includes:
   part of a contact side portion as a side portion of the fixed contact;
   part of the inclined portion; and
   part of the wide portion.

6. The connector according to claim 4, wherein a bottom portion front surface of a flat portion of the bottom portion is flush with a front surface of resin of the housing around the bottom portion front surface.

7. The connector according to claim 4, wherein
the fixed contact protrudes toward the movable contact side with respect to an inner wall surface of the side wall portion, and
the top portion is flush with a top portion wall surface of the side wall portion.

8. The connector according to claim 4, wherein
the housing includes a plurality of the terminals,
the plurality of the terminals is arranged at regular intervals along a longitudinal direction of the housing, and
opposing surfaces of the leg portions and the fixed portions of the plurality of the terminals are supported by the side wall portion.

9. A connector manufacturing method for manufacturing the connector according to claim 1, comprising:
   (A) fixing the terminal to a fixed mold half with a fixing jig;
   (B) having a movable mold half configured to be capable of housing the terminal inside overlap the fixed mold half to which the terminal is fixed to place the terminal inside the movable mold half and press each of the inclined portions of the terminal with the movable mold half;
   (C) injecting insulating resin for forming the housing into a space between the fixed mold half and the movable mold half;
   (D) curing the resin; and
   (E) removing the movable mold half and the fixed mold half to remove the housing molded with the cured resin, the housing holding the terminal.

10. The connector manufacturing method according to claim 9, further comprising removing the fixing jig from the terminal to form the opening portion on the housing back surface of the housing.

11. The connector manufacturing method according to claim 9, wherein
step (B) includes positioning the movable mold half in place with reference to a position of each of the inclined portions.

12. The connector manufacturing method according to claim 9, wherein
step (B) includes the step of pressing a bottom portion front surface of the bottom portion of the terminal with a bottom portion fixed wall provided to a center portion of the movable mold half, and supporting the movable portion of the terminal with a movable portion support wall provided to an end portion of the movable mold half, wherein
the movable mold half determines a first space between a fixed portion front surface of the fixed portion of the terminal and the bottom portion fixed wall, and a second space around the movable portion of the terminal between the bottom portion fixed wall and the movable portion support wall.

13. A connector comprising:
a terminal; and
a housing holding the terminal, wherein
the terminal includes;
   a movable portion including a movable contact as a contact with a counterpart terminal of a counterpart connector;
   a fixed portion including a fixed contact as a contact with the counterpart terminal, the fixed portion facing the movable portion; and
   a bottom portion connecting the movable portion and the fixed portion, wherein
   the fixed portion includes a pair of inclined portions,
   the inclined portions are provided on fixed portion side surfaces on both sides of the fixed portion, respectively, and the inclined portion is formed in such a manner as to spread the width of the fixed portion, the housing includes:
- a mating protrusion on the movable portion side of the terminal; and
- a side wall portion on the fixed portion side of the terminal.

14. The connector according to claim 13, wherein
the fixed portion is embedded in the side wall portion, and is supported by the housing, and
a surface facing the movable portion and a part of the side surface of the fixed portion are exposed from the side wall portion.

15. The connector according to claim 14, wherein the part of the fixed portion side surface exposed from the side wall portion includes:
- part of a contact side portion as a side portion of the fixed contact;
- part of the inclined portion; and
- part of the wide portion.

16. The connector according to claim 14, wherein a bottom portion front surface of a flat portion of the bottom portion is flush with a front surface of resin of the housing around the bottom portion front surface.

17. The connector according to claim 14, wherein
the fixed contact protrudes toward the movable contact side with respect to an inner wall surface of the side wall portion, and
the top portion is flush with a top portion wall surface of the side wall portion.

18. The connector according to claim 14, wherein
the housing includes a plurality of the terminals,
the plurality of the terminals is arranged at regular intervals along a longitudinal direction of the housing, and
opposing surfaces of the leg portions and the fixed portions of the plurality of the terminals are supported by the side wall portion.

* * * * *